W. C. CORYELL.
METAL HANDLING APPARATUS FOR ROLLING MILLS.
APPLICATION FILED DEC. 17, 1914.
1,217,919.
Patented Mar. 6, 1917
6 SHEETS—SHEET 1.
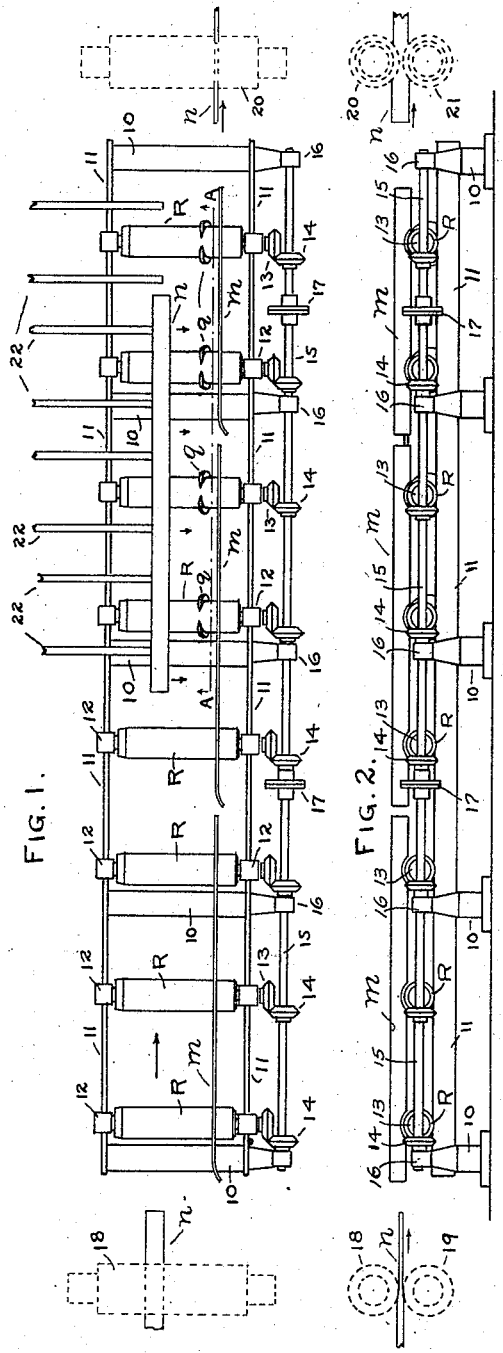
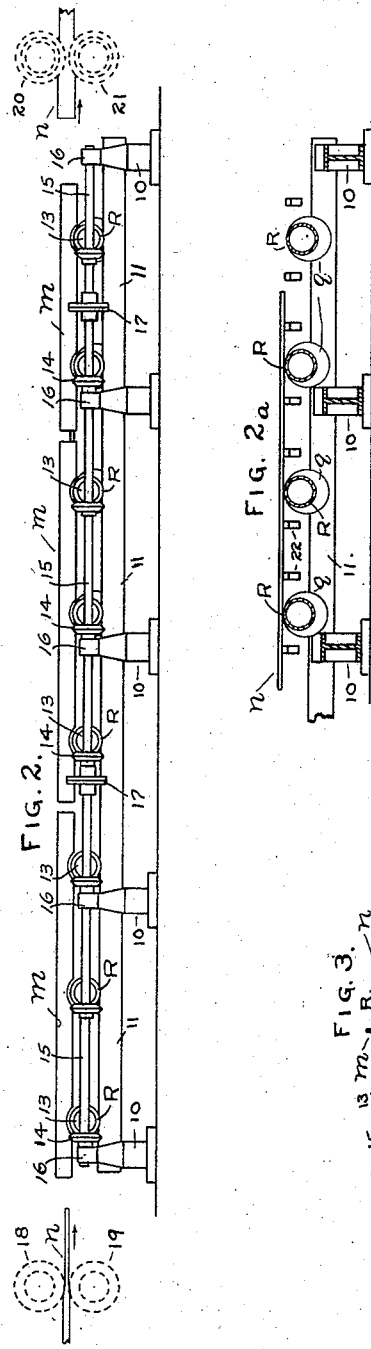
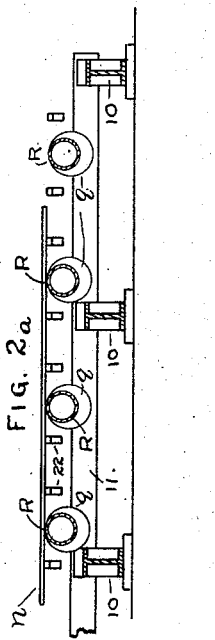
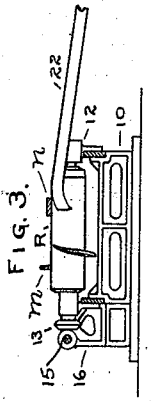
WITNESSES
H. S. Shidd
J. E. Larsen
INVENTOR
William C. Coryell
by Thomas H. Ferguson Atty

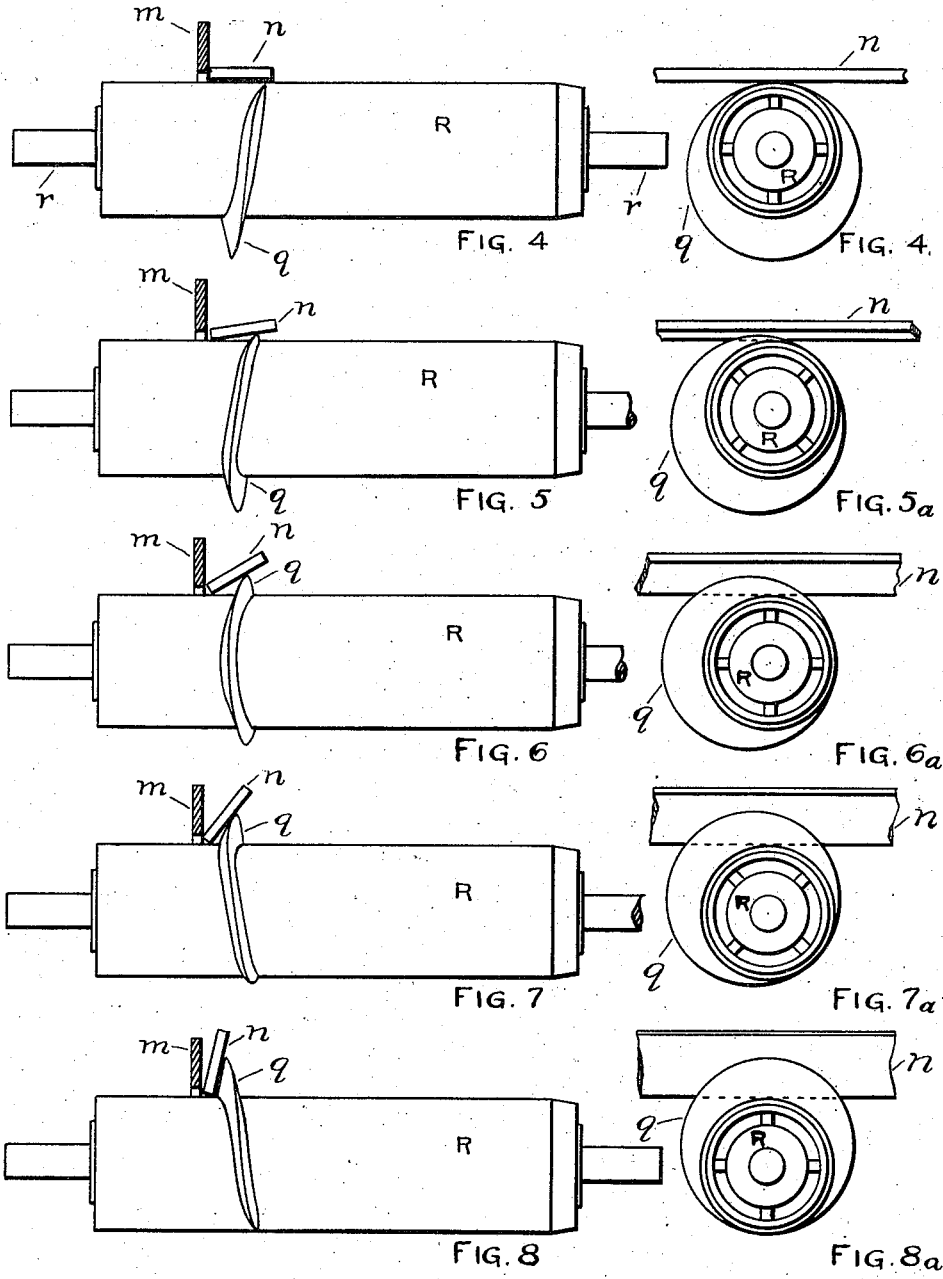

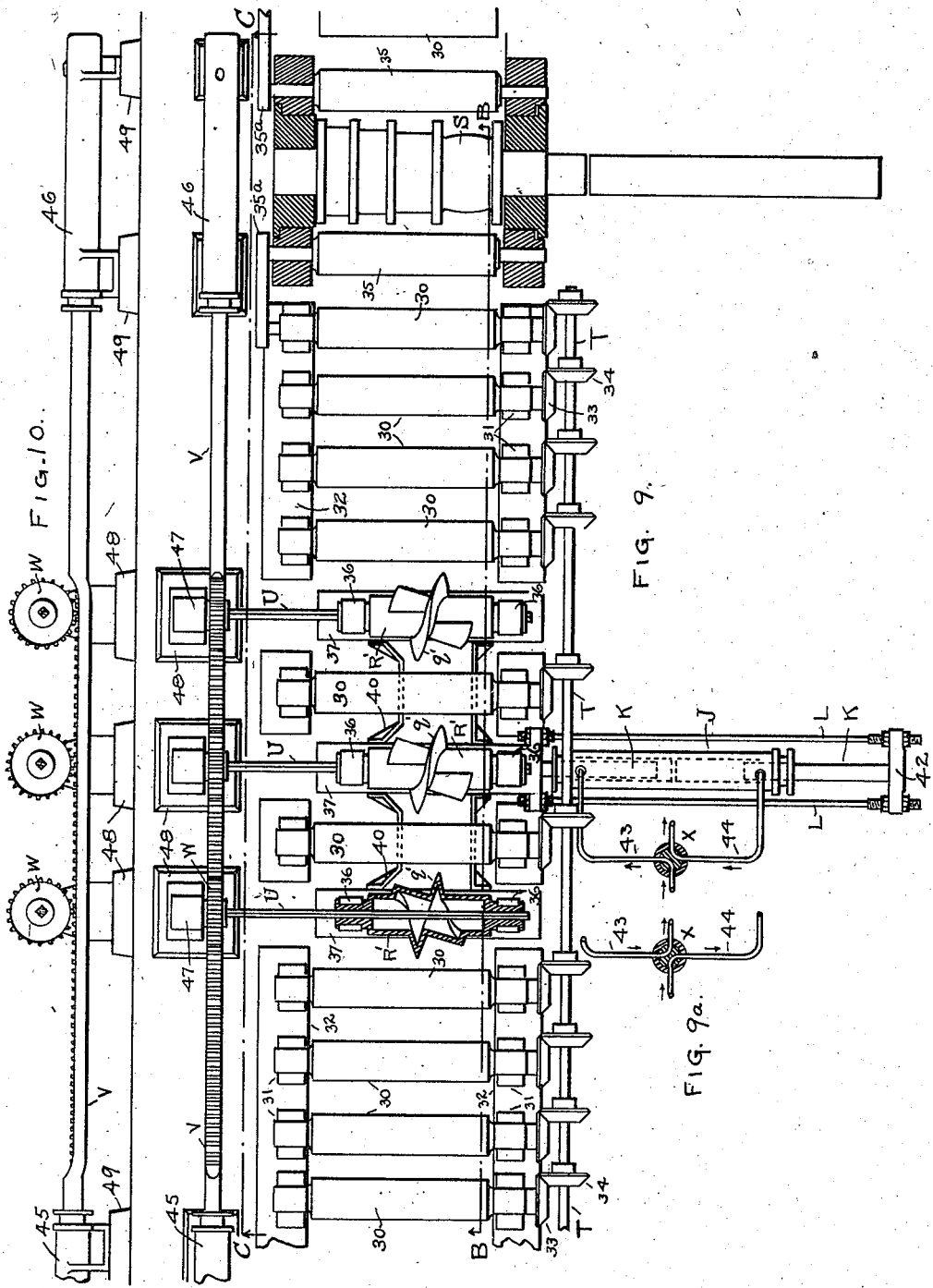

W. C. CORYELL.
METAL HANDLING APPARATUS FOR ROLLING MILLS.
APPLICATION FILED DEC. 17, 1914.
1,217,919.
Patented Mar. 6, 1917.
6 SHEETS—SHEET 4.
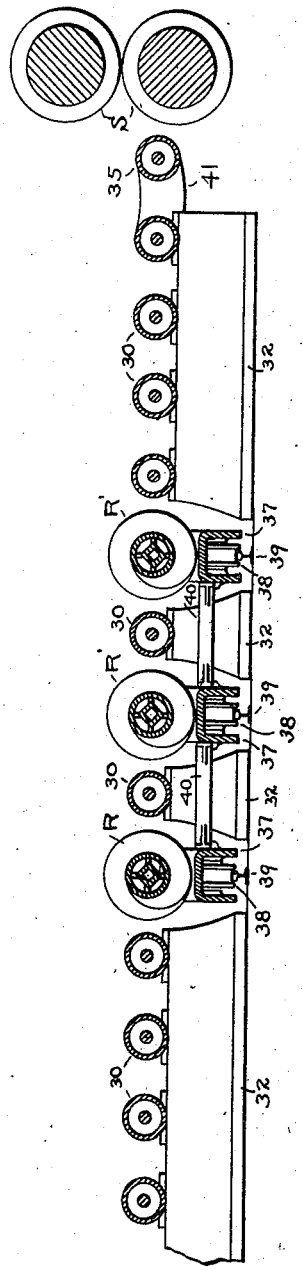
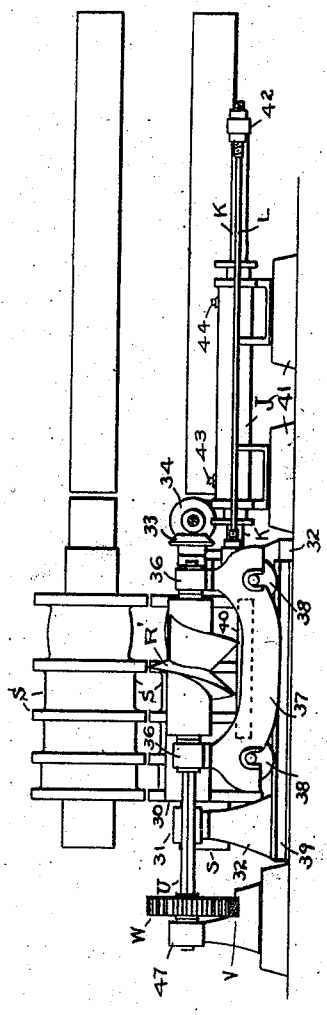

W. C. CORYELL.
METAL HANDLING APPARATUS FOR ROLLING MILLS.
APPLICATION FILED DEC. 17, 1914.
1,217,919.
Patented Mar. 6, 1917.
6 SHEETS—SHEET 5.
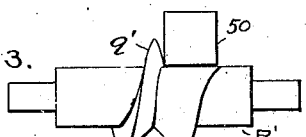
FIG. 13.
FIG. 14.
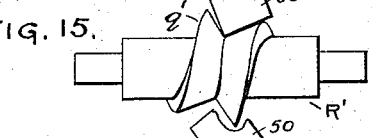
FIG. 15.
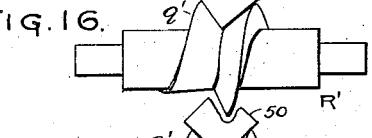
FIG. 16.
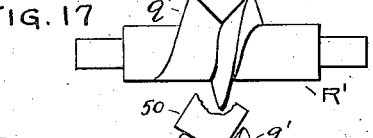
FIG. 17.
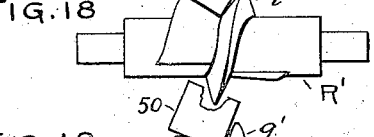
FIG. 18.
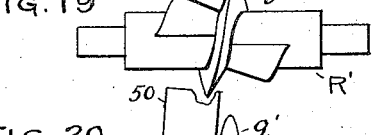
FIG. 19.
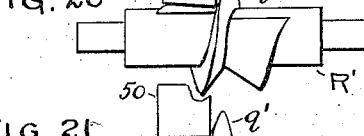
FIG. 20.
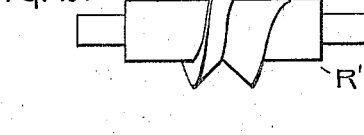
FIG. 21.
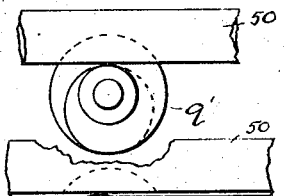
FIG. 13a.
FIG. 14a.
FIG. 15a.
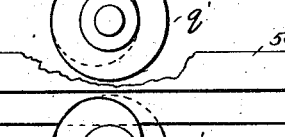
FIG. 16a.
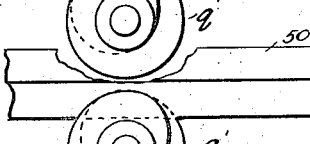
FIG. 17a.
FIG. 18a.
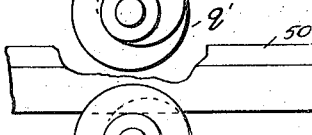
FIG. 19a.
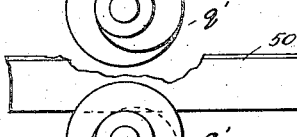
FIG. 20a.
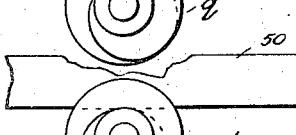
FIG. 21a.
WITNESSES.
H. A. Shedd
J. E. Larsen
INVENTOR.
William C. Coryell
by Thomas H. Ferguson
atty.

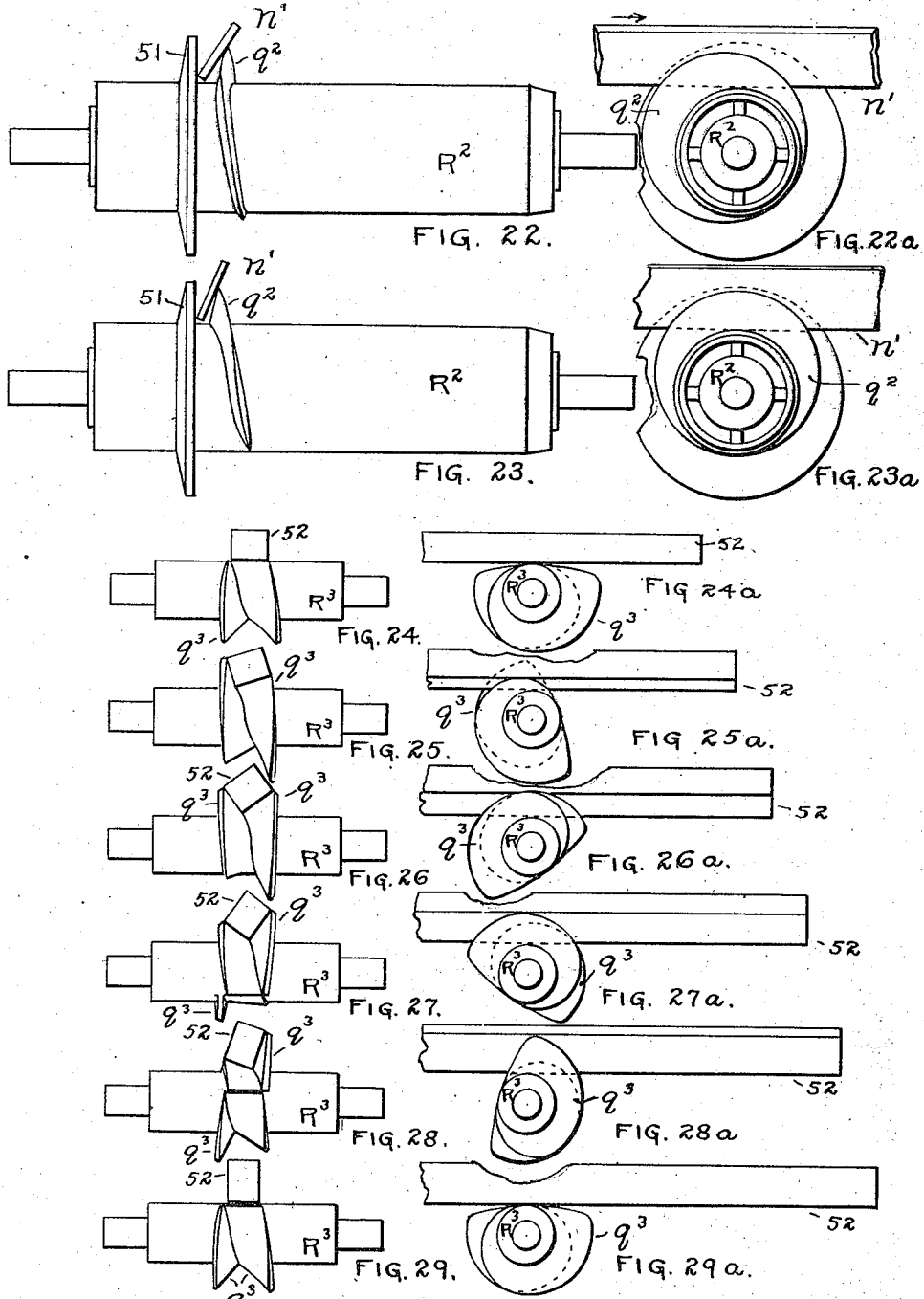

UNITED STATES PATENT OFFICE.

WILLIAM C. CORYELL, OF YOUNGSTOWN, OHIO.

METAL-HANDLING APPARATUS FOR ROLLING-MILLS.

1,217,919. Specification of Letters Patent. Patented Mar. 6, 1917.

Application filed December 17, 1914. Serial No. 877,672.

*To all whom it may concern:*

Be it known that I, WILLIAM C. CORYELL, a citizen of the United States, residing at Youngstown, county of Mahoning, State of Ohio, have invented certain new and useful Improvements in Metal-Handling Apparatus for Rolling-Mills, of which the following is a specification.

The present invention relates to apparatus for use in handling and conveying metal in connection with rolling mills and has to do more particularly with apparatus for shifting the pieces of metal between passes of the mill so that each piece will be properly worked and shaped.

One object of the invention is to provide apparatus of the kind specified in which the piece of metal being operated upon may be rotated or otherwise moved transversely to its general direction of travel by means of one or more parts associated with and operated upon the rotation of rollers, like the feed rollers of a feed table or rollers upon the carriage of the manipulator. Another object of the invention is to so construct these parts that the operation of the parts to shift the piece transversely will also bring about a movement of the piece in the direction of its travel. Another object is to bring about these changes in the position of the piece with a minimum of expenditure of energy and with gradual rather than abrupt movements.

In the preferred embodiments of my invention these objects are attained by employing cams upon the rollers and shaping them to suit the shape of the piece to be handled and the degree and character of the movement to be given to it, or by employing cams and coöperating fixed guides or other members and properly shaping these to suit the form of the piece and the degree and character of the movement.

In the accompanying drawings I have illustrated my invention as applied both to an edger and to a manipulator. A consideration of these drawings taken in connection with the accompanying description will make the character of the invention clear and show its applicability to other forms of metal handling apparatus. The scope of the invention will be particularly pointed out in the appended claims.

In the drawing, Figures 1 to 8$^a$, inclusive, relate to the edger; Figs. 9 to 21$^a$, inclusive, to the manipulator; and the remaining figures to modified roller constructions for both edger and manipulator.

Fig. 1 is a plan view of an edging table embodying my invention and positioned between two sets of reducing rolls of a rolling mill; Fig. 2 is a side elevation of the same; Fig. 2$^a$ is a partial longitudinal section of the same upon a plane indicated by the line A—A of Fig. 1; Fig. 3 is an end elevation of the same viewed from the right in Fig. 1; Fig. 4 is an elevation of one of the rollers of the edger of Fig. 1 and illustrates a slab of metal on the roller in its horizontal position; Fig. 4$^a$ is an end elevation of the same but omitting the guide; and Figs. 5, 5$^a$, 6, 6$^a$, 7, 7$^a$, 8 and 8$^a$ are similar elevations illustrating successive positions of the parts and the piece of metal as the former move the latter from its horizontal flat to its vertical edged position; Fig. 9 is a plan view of a manipulator and the associated table positioned adjacent to the reducing rolls of a rolling mill; Fig. 9$^a$ is a diagram illustrating one of the positions of a control valve of the manipulator; Fig. 10 is a side elevation of the roller-rotating mechanism of the manipulator, parts being in section upon a plane indicated by the line C—C of Fig. 9; Fig. 11 is a vertical section of a portion of the manipulator and adjacent table, taken on a plane indicated by the line B—B of Fig. 9; Fig. 12 is an end elevation of the manipulator and associated parts, as viewed from the left in Fig. 9; Fig. 13 is an elevation of a manipulator roll illustrating a piece of metal in its initial position; Fig. 13$^a$ is an end elevation of the same; and Figs. 14, 14$^a$, 15, 15$^a$, 16, 16$^a$, 17, 17$^a$, 18, 18$^a$, 19, 19$^a$, 20, 20$^a$, 21 and 21$^a$ are similar elevations illustrating successive positions of the parts and their action upon the piece of metal; Figs. 22 and 22$^a$ are views, similar to Figs. 7 and 7$^a$, of a modified construction of an edger roller, illustrating the piece of metal which is being operated upon in a position corresponding to that of Figs. 7 and 7$^a$; Figs. 23 and 23$^a$ illustrate this same modified edger roller with its parts in a position corresponding to those of Figs. 8 and 8$^a$, respectively; Figs. 24 and 24$^a$ are similar views of a modified roller construction for the manipulator, illustrating the metal in its initial position upon the roller; Figs. 25, 25$^a$, 26, 26$^a$, 27, 27$^a$, 28, 28$^a$, 29 and 29$^a$ are similar views illustrating this modified manipulator roller in successive positions which illustrate the manner of rotating the metal without giving it a lateral movement of translation.

Throughout these several views like characters refer to like parts.

Referring for the present to Figs. 1 to 8ª, inclusive, 10 designates the stands of the edger table which are connected at their opposite ends by the cheek plates 11 which in turn carry the bearings 12 of the rollers R upon which the pieces of metal to be handled are received and conveyed. Each roller is provided at one end with a miter gear wheel 13 which meshes with a coöperating miter gear wheel 14 upon a table shaft 15 journaled in bearings 16 upon the ends of the stands 10. The sections of the table shaft 15 are united by suitable couplings 17. The table shaft 15 may be driven from any suitable source and when so driven the rollers R are actuated to convey the pieces of metal which are being put through the mill. This construction is illustrative of the common table and conveyer construction employed for handling the metal between the successive passes of a rolling mill. Rolls 18 and 19 at one end of this table and rolls 20 and 21 at the other end illustrate two sets of reducing rolls in a rolling mill construction. In practice the pieces of metal, such as $n$, which are being put through the mill, pass successively between the rolls 18 and 19 on to the rollers R of the table and thence from the table through the rolls 20 and 21. All of this operation and the mechanism for accomplishing it are old in the art and need not be described in greater detail.

In the handling apparatus illustrated in these figures the strip of metal passes between the rolls 18, 19, in a flat or horizontal position and between the rolls 20 and 21 in a vertical or edging position. In order to change from the horizontal position to the vertical position, some edging device must be employed. My invention may be utilized for this purpose. In the particular embodiment of my invention illustrated in this edging construction, four of the rollers R are provided with cams $q$ of the general shape illustrated in Figs. 4 to 8ª, inclusive. In each case this cam extends through some 270 degrees of circumference of the roller and it is preferably gradually tapered down at its ends to the surface of the roller. At its intermediate points it varies in its position lengthwise of the roller and is shaped so that the piece of metal being operated upon will be gradually raised at one edge, while being held at the other by the guard $m$, until it is brought to a vertical position, that is to say, until it is "edged". In operation the pieces run flatwise over the cylindrical portions of the rollers R into a position such as illustrated by the middle piece $n$ in Fig. 1. In practice the rollers R will be brought to rest in a position such that the cams lie below a horizontal plane tangent to the upper surfaces of the rollers and therefore in a position such that the bar $n$ may be pushed or drawn lengthwise of the rollers R against the guards $m$ into position above the cams. A subsequent starting of the rollers will cause the piece to pass successively through the various positions illustrated in Figs. 4 to 8ª, inclusive, and thereby bring the piece from a horizontal or flat position to a vertical or edgewise position. It will also be noted that while the piece is being edged it is also being advanced toward the rolls 20 and 21. When once edged, the continued operation of the rollers R continues to advance the piece and then force it into the edging pass of the rolls 20, 21. The piece $n$ may be shifted to its position above the cams either by hand or by any suitable mechanism. In some instances the piece may be brought from another table over the transfer bars 22 to the table illustrated in Fig. 1 and then edged by the cams for presentation to the edging pass of the rolls 20, 21.

In the ordinary table construction, aprons are provided between the rollers R, but in the present instance I have omitted these for the sake of clearness.

Referring to Figs. 9 to 21ª, inclusive, which illustrate the application of my invention to a manipulator construction, 30 designates table rollers, similar to those illustrated in Fig. 1, which are suitably journaled in bearings 31 carried upon side frame 32 which are in turn supported upon a suitable foundation. The rollers 30 are provided with miter gear wheels 33 in each instance, except in the case of the right hand roller 35 which in the case illustrated has a special chain and sprocket drive covered by the casing 35ª. The miter gear wheels 33 mesh with coöperating miter gear wheels 34 mounted upon the table shaft T which may be driven from any suitable source to rotate the rollers in either direction to carry the piece of metal being handled back and forth with reference to the set of reducing rolls S mounted adjacent to them. The rollers 30 and 35 are in position to receive the metal from the rolls as it is being passed back and forth through the different passes of these rolls. In the case illustrated the roller 35 is positioned adjacent to the rolls S and is mounted upon the roll housings. It will, of course, be understood that in practice other conveying tables will be provided on the other side of the set of reducing rolls S to handle the metal when it passes to that side. In this table construction spaces are left between certain of the rollers 30 to provide space for the manipulator rollers R′ upon which are located cams $q'$. The rollers R′ are journaled at their ends in bearings 36 located upon the truck frames 37. These frames are provided at their opposite ends with wheels 38 which are adapted to travel back and forth upon short rails 39. Three manipulator rollers R' and three truck members 37 with their corresponding wheels and rails are provided in the illustrated embodiment. The truck members 37 are united by separators 40 which lie beneath the intervening rollers 30 of the table. In operation the trucks which carry the rollers R' are moved back and forth to bring the cams q' into proper alinement with the passes of the rolls S in order that the piece of metal being handled may be received upon the cams or delivered therefrom in line with the proper passes of the rolls. To bring about this transverse movement of the truck and its rollers the manipulator is provided with a shifting cylinder J which is mounted upon suitable supports 41. This cylinder is preferably positioned opposite the center of the truck. It is bored out at both ends so as to form separate cylinders for the reception of two plungers K. One of these plungers projects into the cylinder directly from the truck, while the other projects into the cylinder from a cross-head 42 which is secured to the truck by tie rods L. The plungers may be actuated by any suitable fluid, as water under high pressure, applied through the pipes 43, 44, controlled by a four-way valve X. When this valve is in the position of Fig. 9, pressure is supplied to one cylinder and the other cylinder is allowed to exhaust. When the valve X is in the position of Fig. 9$^a$, the second cylinder is supplied with fluid under pressure and the first is allowed to exhaust. By manipulating the valve X the pressure in the two parts of the cylinder J may be varied so as to bring the plungers to any desired position and thereby shift the truck and the manipulating rollers R' to desired positions. In Figs. 9 and 9$^a$, the arrows indicate the direction of flow through the pipes 43, 44. The ports of the valve X may be closed so as to maintain the plungers in any desired position by shifting the valve to positions other than those illustrated.

Besides having the longitudinal movement brought about by the operation of the shifting cylinder J, the manipulator rollers R' are likewise capable of rotation under the action of a toothed rack V which is similarly shifted by means of shifting cylinders 45, 46 acting upon plungers upon the ends of the rack V. These cylinders and plungers are operable and controllable in the same way as the two parts of the cylinder J, and their operation need not be further described. The rack V in its reciprocations acts upon gear wheels W which are respectively carried upon shafts U which are each journaled at one end in a bearing 47 and at the other end extend into the associated roller R'. The shafts U are squared at their inner ends and fit into suitable squared openings in the rollers R' so that as the shafts rotate the rollers also may be rotated. The rollers R' are thus free to move longitudinally of the shafts U but must rotate with the latter when they rotate. The bearings 47 and the cylinders 45 and 46 have suitable bases 48, 49, respectively. It will be seen that as the rack V is shifted back and forth, the shafts U are rotated one whole revolution for each whole stroke of the rack, the direction of rotation depending upon the direction of movement of the rack V.

In practice the piece of metal as it passes from the rolls S is received upon the rollers 30 and by these it is conveyed over the manipulator rollers R' into position to be operated upon by the cams q', as the rollers R' rotate. As the piece of metal emerges from the rolls S an operator shifts the manipulator rollers R' into the proper position to receive the metal upon the proper part of the cams. Thus with the form of the cam illustrated in Figs. 13 to 21$^a$, inclusive, the piece of metal, designated 50, is received upon the right hand portion of the cam, as there viewed. It will be understood that in order to receive the piece upon this portion of the cam, it will be necessary to bring this portion of the cam into line with the particular pass of the rolls S from which the piece emerges. When thus positioned over the right hand portions of the cams q' of the rollers R', the operator shifts the rack V and thus rotates the rollers R' and, where the shape of the cam is that illustrated in these figures of the drawing, the piece is gradually rotated and shifted until it occupies the position illustrated in Figs. 21 and 21$^a$. When in this latter position it has been rotated 90 degrees so that different sides of the metal are in position to be acted upon by the rolls, and the piece is also in line with the next pass of the rolls. By reference to Figs. 13 to 21$^a$, which illustrate the successive positions of the parts, it will be seen that the rotation of the piece is brought about gradually and that it is lifted a minimum distance in making the rotation and transfer, thereby bringing about these changes with a minimum expenditure of energy and minimum shock.

It will, of course, be understood that the cams to be employed upon the rollers may be varied to suit the shape of the pieces of metal to be handled and the character of the movement to be given to them, keeping also in mind whether the operation is to be accomplished by cams alone or by cams in conjunction with fixed guides or other stationary parts.

As illustrative of possible variations in this direction, attention is called to Figs. 22, 22ª, 23, and 23ª, which illustrate a modified arrangement of the face of an edging roller. According to this modification, the roller, designated R², is provided with a cam $q^2$ similar in all respects to the cam $q$ of the roller R, and with a work-engaging part or collar 51 which is in the form of a concentric ring about the roller in position to coöperate with cam $q^2$ in the way that guide $m$ coöperates with the cam $q$ on roller R. These figures illustrate but two positions of this modified edging roller and the piece of metal $n'$ being edged, but the other positions which the parts will occupy will be readily understood because of the similarity of this modification to the form illustrated in Figs. 4 to 8ª, inclusive.

A further modified cam arrangement is illustrated in Figs. 24 to 29ª, inclusive. This cam is somewhat similar in shape and operation to the cam $q'$ of the roller R'. In this instance the roller is designated R³ and the cam $q^3$. This cam is so constructed that a complete rotation of the roller R³ will cause the cam to gradually rotate the piece of metal through 90 degrees so as to present the other two sides of the piece to the action of the rolls but to do so without transferring the position of the piece relative to the pass of the rolls from which it has emerged. In other words, this cam receives the piece of metal from a given pass of the rolls and after rotating it through 90 degrees leaves it in position to be returned through the same pass.

It will, of course, be understood that where such rollers are employed in connection with three-high rolls and tilting or vertically moving tables, the rotation of the piece without lateral translation will not necessarily result in returning the piece through the same pass but might, if desired, be used to rotate the piece and bring it into position to return through a pass directly above or directly below the one from which it was received.

It will also be understood that in the operation of the manipulator disclosed herein the rollers R' may be shifted longitudinally even after the piece of metal has been lodged upon them.

These matters of the varied operation and the varied applications of my invention will be readily appreciated by those skilled in the art to which my invention relates. It will also be understood by such that the cam faces which gradually change in position from point to point, may be replaced by other forms of engaging faces which will bring about equivalent or other desired results. Accordingly, I do not wish to be limited to the particular embodiments of my invention which are herein disclosed, but aim to cover the various applications of the invention and the various modifications which rightly come within its scope by the terms of the appended claims.

What I claim as new and desire to secure by Letters Patent of the United States is:—

1. Metal handling apparatus for rolling mills comprising a plurality of substantially parallel rollers operative to receive the pieces of metal being put through the mill, a work-engaging face on one of said rollers and work-engaging means coöperating with said face to change the position of any such piece on said rollers, the work-engaging face on said roller extending above the surface of the roller and having its highest work-engaging points extending around said roller, the distance of said points from the axis of said roller varying gradually from a minimum to a maximum and the distance of said points from a plane at right angles to said axis likewise varying gradually from a minimum to a maximum.

2. Metal handling apparatus for rolling mills comprising a plurality of substantially parallel rollers operative to receive the pieces of metal being put through the mill, a work-engaging face on one of said rollers and work-engaging means coöperating with said face to change the position of any such piece on said rollers, the work-engaging face on said roller extending above the surface of the roller and having its highest work-engaging points varying gradually from point to point in their distances from the axis of said roller and from a plane at right angles to that axis, the point nearest said axis being farthest from said plane and the point farthest from said axis being nearest to said plane.

3. Metal handling apparatus for rolling mills comprising a plurality of substantially parallel rollers operative to receive the pieces of metal being put through the mill, a work-engaging face on one of said rollers and work-engaging means coöperating with the first to change the position of any such piece on said rollers, said work-engaging face on said roller comprising a cam portion gradually rising from the surface of said roller and approaching said work-engaging means and then gradually receding to the surface of said roller.

4. Metal handling apparatus for rolling mills comprising a plurality of substantially parallel rollers operative to receive the pieces of metal being put through the mill, two work-engaging cam portions on one of said rollers extending above the normal surface of said roller and forming a space between them for receiving any such piece, said cam portions being shaped so as to change the position of any such piece by a gradual movement as said roller rotates.

5. Metal handling apparatus for rolling mills comprising a plurality of substantially parallel rollers operative to receive the pieces of metal being put through the mill, two work-engaging cam portions on one of said rollers extending above the normal surface of said roller and forming a space between them for receiving any such piece, said cam portions being shaped so as to rotate any such piece through a definite angle upon a definite rotation of said roller.

6. Metal handling apparatus for rolling mills comprising a plurality of substantially parallel rollers operative to receive the pieces of metal being put through the mill, two work-engaging cam portions on one of said rollers extending above the normal surface of said roller and forming a space between them for receiving any such piece, said cam portions being shaped so as to engage any such piece on opposite sides of a line extending in the general direction of travel of the piece through the centers of gravity of its various transverse sections, to move said piece transversely as said roller is rotated.

7. Metal handling apparatus for rolling mills comprising a plurality of substantially parallel rollers operative to receive the pieces of metal being put through the mill, a work-engaging face on one of said rollers and work-engaging means coöperating with said face to change the position of any such piece on said rollers, the points of said face which engage said piece on its under side varying gradually in their distances from the axis of said roller, whereby said piece bears upon a gradually changing surface and is advanced in its general direction of travel at the same time it is being shifted transversely.

8. Metal handling apparatus for rolling mills comprising a plurality of substantially parallel rollers operative to receive the pieces of metal being put through the mill, two work-engaging cam portions on one of said rollers extending above the normal surface of said roller and forming a space between them for receiving any such piece, said cam portions being shaped so as to change the position of any such piece transversely of its general direction of travel by gradual movement as said roller rotates and the points at the lowest and adjacent portions of said space varying gradually in distance from the axis of said roller, whereby said piece bears upon a gradually changing surface and is advanced in its general direction of travel at the same time it is being shifted transversely.

9. Metal handling apparatus for rolling mills comprising a plurality of substantially parallel rollers operative to receive the pieces of metal being put through the mill, two work-engaging cam portions on one of said rollers extending above the normal surface of said roller and forming a space between them for receiving any such piece, said cam portions being shaped so as to rotate any such piece through a definite angle upon a definite rotation of said roller and the points at the lowest and adjacent portions of said space varying gradually in distance from the axis of said roller, whereby said piece bears upon a gradually changing surface and is advanced in its general direction of travel at the same time it is being shifted transversely.

10. Metal handling apparatus for rolling mills comprising feed table rollers for conveying the pieces of metal being put through the mill, and means for gradually rotating any such piece in a direction transverse to its direction of travel at the same time it is uniformly advancing under the conveying action of said rollers.

11. Metal handling apparatus for rolling mills comprising a plurality of substantially parallel rollers operative to receive the pieces of metal being put through the mill, and means for rotating said rollers, one of said rollers having an inclined portion having its work-engaging parts varying uniformly in distance from the roller axis for gradually rotating any such piece in a direction transverse to the general direction of its travel and another portion for uniformly moving said piece only in the direction of its travel.

12. Metal handling apparatus for rolling mills comprising a plurality of substantially parallel rollers operative to receive the pieces of metal being put through the mill, and means for rotating said rollers, one of said rollers having a portion for gradually rotating any such piece in a direction transverse to the general direction of its travel and simultaneously uniformly moving the same in the direction of its travel and another portion for moving said piece only in the direction of its travel.

13. Metal handling apparatus for rolling mills comprising a plurality of substantially parallel rollers operative to receive the pieces of metal being put through the mill, and means for rotating said rollers, one of said rollers having means thereon for uniformly advancing any such piece a linear distance and simultaneously gradually rotating the same a definite distance in a direction transverse to the direction of said linear distance, said linear and transverse distances bearing a constant ratio to each other.

14. A metal handling apparatus for rolling mills comprising a plurality of substantially parallel rollers operative to receive the pieces of metal being put through the mill, means for rotating said rollers to convey the pieces thereover, additional rollers spaced between said parallel rollers and provided with work-engaging parts for acting upon said pieces, a truck movable transversely of the direction of travel of said pieces, upon which said additional rollers are mounted, means for shifting said truck back and forth, and means for rotating said additional rollers independently of said parallel rollers.

15. A metal handling apparatus for rolling mills comprising a plurality of substantially parallel rollers operative to receive the pieces of metal being put through the mill, means for rotating said rollers to convey the pieces thereover, additional rollers spaced between said parallel rollers and provided with work-engaging parts for acting upon said pieces, a truck movable transversely of the direction of travel of said pieces, upon which said additional rollers are mounted, means for shifting said truck back and forth, shafts for said additional rollers having slidable non-rotatable connections therewith, fixed bearings for said shafts, and means for rotating said shafts, whereby said additional rollers may be actuated irrespective of the position of said truck.

16. A metal handling apparatus for rolling mills comprising a plurality of substantially parallel rollers operative to receive the pieces of metal being put through the mill, means for rotating said rollers to convey the pieces thereover, additional rollers spaced between said parallel rollers and provided with work-engaging parts for acting upon said pieces, a truck movable transversely of the direction of travel of said pieces, upon which said additional rollers are mounted, means for shifting said truck back and forth, a rack extending parallel to the direction of travel of said pieces, means for shifting said rack back and forth, pinions engaging said rack and rotatable as said rack is shifted, shafts for said pinions, fixed bearings for said shafts, and longitudinally slidable non-rotatable connections between said shafts and said additional rollers respectively, whereby the latter may be rotated in all positions of said truck.

17. Metal handling apparatus for rolling mills comprising a plurality of substantially parallel rollers operative to receive the pieces of metal being put through the mill, work-engaging parts on one of said rollers extending above the normal surface of said roller and forming for several positions of said roll a trough-like space between them for receiving any such piece, said parts being shaped so as to gradually change the position of such piece as said roller rotates.

18. Metal handling apparatus for rolling mills comprising a plurality of substantially parallel rollers operative to receive the pieces of metal being put through the mill, work-engaging parts on one of said rollers extending above the normal surface of said roller and forming for several positions of said roll a trough-like space between them for receiving any such piece, the relative heights of said parts on opposite sides of said space varying gradually from point to point so as to bring about a gradual change in the position of such piece as said roller is rotated.

19. In a rolling mill, the combination with reducing rolls having a plurality of passes, of a roller for receiving a piece of material as it passes from one pass, said roller having its axis substantially parallel to those of said rolls, and means on said roller for rotating said piece of material and bringing it into position to advance through the next pass of said rolls.

In witness whereof, I hereunto subscribe my name this 15th day of December, A. D. 1914.

WILLIAM C. CORYELL.